United States Patent
Burkhardt et al.

(10) Patent No.: US 10,422,370 B2
(45) Date of Patent: Sep. 24, 2019

(54) ADHESIVE MEANS CONTAINING PARTICLES FOR CONNECTING TWO VEHICLE PARTS

(71) Applicant: MAN Truck & Bus AG, München (DE)

(72) Inventors: Wolfgang Burkhardt, Ansbach (DE); Alexander Rosner, Nürnberg (DE)

(73) Assignee: MAN TRUCK & BUS AG, München (DE)

(*) Notice: Subject to any disclaimer, the term of this patent is extended or adjusted under 35 U.S.C. 154(b) by 319 days.

(21) Appl. No.: 15/388,141

(22) Filed: Dec. 22, 2016

(65) Prior Publication Data

US 2017/0175802 A1    Jun. 22, 2017

(30) Foreign Application Priority Data

Dec. 22, 2015   (DE) .......................... 10 2015 016 702

(51) Int. Cl.

| | |
|---|---|
| *F16B 47/00* | (2006.01) |
| *C09J 9/00* | (2006.01) |
| *C09J 5/00* | (2006.01) |
| *C09J 11/04* | (2006.01) |
| *F16B 11/00* | (2006.01) |
| *C09J 7/10* | (2018.01) |
| *B60K 5/12* | (2006.01) |
| *F16H 53/02* | (2006.01) |
| *F16H 55/06* | (2006.01) |

(52) U.S. Cl.
CPC .............. *F16B 47/003* (2013.01); *C09J 5/00* (2013.01); *C09J 7/10* (2018.01); *C09J 9/00* (2013.01); *C09J 11/04* (2013.01); *F16B 11/006* (2013.01); *B60K 5/12* (2013.01); *F16H 53/025* (2013.01); *F16H 55/06* (2013.01)

(58) Field of Classification Search
CPC ......... F16B 11/006; F16B 47/003; C09J 7/00; C09J 11/04
See application file for complete search history.

(56) References Cited

U.S. PATENT DOCUMENTS

| | | | | |
|---|---|---|---|---|
| 4,684,558 A | * | 8/1987 | Keusch .................... | C08J 3/28 204/168 |
| 5,554,240 A | * | 9/1996 | Toy ....................... | F16B 11/006 156/304.1 |
| 6,413,354 B1 | * | 7/2002 | Haas ....................... | C08K 5/01 156/329 |

(Continued)

FOREIGN PATENT DOCUMENTS

| | | |
|---|---|---|
| DE | 19504482 A1 | 8/1996 |
| DE | 10121086 A1 | 12/2002 |

(Continued)

OTHER PUBLICATIONS

European Search Report issued in corresponding application No. 16002496.4 dated May 31, 2017.

*Primary Examiner* — Jonathan P Masinick
(74) *Attorney, Agent, or Firm* — Weber Rosselli & Cannon LLP

(57) ABSTRACT

A vehicle component, in particular an engine part, having at least one attachment, wherein the vehicle component and the attachment are connected to one another by means of an adhesive means and particles are introduced into the adhesive means.

16 Claims, 2 Drawing Sheets

(56) References Cited

U.S. PATENT DOCUMENTS

| | | | |
|---|---|---|---|
| 8,492,959 B2* | 7/2013 | Kitayama | C09J 11/06 310/324 |
| 8,851,787 B2* | 10/2014 | Kelley | B29C 65/542 403/402 |
| 8,999,455 B2* | 4/2015 | Araki | C09J 7/10 427/508 |
| 9,023,249 B2* | 5/2015 | Fathi | B41J 2/17559 252/501.1 |
| 2005/0274454 A1* | 12/2005 | Extrand | C09J 5/00 156/272.4 |
| 2006/0014867 A1 | 1/2006 | Green et al. | |
| 2010/0116314 A1* | 5/2010 | Fukushima | C09J 9/02 136/244 |
| 2011/0267791 A1* | 11/2011 | Tomisaka | C09J 9/02 361/783 |
| 2013/0118692 A1* | 5/2013 | Miki | B32B 43/006 156/711 |
| 2015/0059508 A1* | 3/2015 | Ekonen | F16H 63/08 74/473.1 |
| 2015/0137347 A1* | 5/2015 | Nakako | C09J 1/00 257/734 |
| 2015/0192029 A1* | 7/2015 | Roberts, III | F01D 5/20 415/173.1 |

FOREIGN PATENT DOCUMENTS

| | | |
|---|---|---|
| JP | S58-189277 A | 11/1983 |
| JP | H11259157 A | 9/1999 |
| JP | 2012186125 A | 9/2012 |
| JP | 2013181106 A | 9/2013 |

* cited by examiner

ADHESIVE MEANS CONTAINING PARTICLES FOR CONNECTING TWO VEHICLE PARTS

BACKGROUND

1. Technical Field

The present disclosure relates to a vehicle component having an attachment mounted thereon. In particular, the vehicle component is a shaft, whereas the attachment is preferably a cam or a gearwheel. The vehicle component can likewise be an engine block, for example, whereas the attachment can be, in particular, an engine support.

2. Description of Related Art

According to the prior art, flanges, cams or gearwheels are usually mounted on the associated shaft by means of a nonpositive joint, thus allowing shear forces (resulting from torques, for example) to be transmitted between the shaft and the flange, the cams or the gearwheels. The level of shear forces which can be transmitted between the shaft and the cams or the gearwheels is decisively determined by the nonpositive joint, in particular by the mechanical friction coefficient produced by the nonpositive joint.

SUMMARY

It is an object of the present disclosure to provide an alternative joint between a vehicle component and an attachment and/or such a joint which is capable of bearing higher stress, expediently one subject to shear.

This object can be achieved by means of the features of the main claim. Advantageous developments of the present disclosure can be found in the dependent claims and the following description of preferred embodiments of the present disclosure.

The present disclosure provides a vehicle component, in particular an engine part (e.g. a shaft, an engine block etc.), having at least one attachment, wherein the vehicle component and the attachment are connected to one another in an adhesive bonding region, preferably an adhesive bonding region that can be subjected to shear, by means of an adhesive means (e.g. adhesive). In particular, the adhesive means is distinguished by the fact that particles are introduced into the adhesive means, with the result that the adhesive means preferably brings about a material joint and/or the particles have the effect of increasing friction between the vehicle component and the attachment.

By means of the particles introduced into the adhesive means, it is possible, in particular, to achieve an increase in shear strength, which expediently leads to a stronger joint between the vehicle component and the attachment.

The adhesive means has an adhesive strength. In particular, the adhesive strength describes the strength of the joint between the adhesive means and the materials of the components to be connected, that is to say, in particular, the vehicle component and the attachment.

The adhesive means has a cohesive strength. In particular, the cohesive strength describes the inherent strength of the adhesive means.

It is possible for the cohesive strength of the adhesive means to be greater than the adhesive strength of the adhesive means. As an alternative or in addition, the particles can be harder in the adhesive bonding region than the material of the attachment.

By introducing particles, expediently small solid particles, preferably uniformly, into the adhesive means, the surface areas with an adhesive effect can be increased. Distribution of the particles in the adhesive means, preferably as uniformly as possible, is desirable.

The strength of the particles is preferably greater than the strength of the adhesive means.

It is possible for the particles to be harder in the adhesive bonding region than the material of the vehicle component.

It is possible for the surface of the particles to be jagged and, in particular, to be noncircular in order expediently to achieve enlargement of the surface area and/or to allow an interlocking effect with the surface of the vehicle component and/or of the attachment.

It is possible for the surface of the vehicle component and/or the surface of the attachment to be jagged and/or textured, e.g. by surface machining, and thus, in particular, to be uneven in order expediently to achieve an enlargement of the surface area and/or to allow an interlocking effect with the particles.

In one embodiment, in which the surface of the particles is jagged and the surface of the vehicle component and/or the surface of the attachment is jagged/textured, an interlocking effect between the particles, on the one hand, and the vehicle component and/or the attachment, on the other hand, can expediently be achieved.

The jagged surfaces of the particles preferably likewise allow lengthening of a potential failure crack (e.g. crack surface), leading, in particular, to an increase in the strength of the adhesive bond between the vehicle component and the attachment.

It is possible that i) the particles are in contact with the surface of the vehicle component and/or the surface of the attachment, ii) are interlocked with the surface of the vehicle component and/or the surface of the attachment, and/or iii) are worked into the surface of the vehicle component and/or the surface of the attachment, e.g. by applying a static normal force or a dynamic movement when joining the vehicle component and the attachment.

It is possible for the thickness of the adhesive bonding region between the vehicle component and the attachment and the dimensioning of the particles to be such that individual particles are in contact and/or interlocked with the vehicle component, on the one hand, and simultaneously with the attachment, on the other hand.

It is likewise possible for the thickness of the adhesive bonding region between the vehicle component and the attachment and the dimensioning of the particles to be such that individual particles are in contact and/or interlocked only with the vehicle component, but expediently spaced apart from the attachment, whereas other particles are in contact and/or interlocked only with the attachment, but expediently spaced apart from the vehicle component.

It is possible for the particles to have a diameter, a width and/or length greater than or equal to 0.01 mm and/or less than or equal to 0.1 mm.

The adhesive means is preferably part of a frictional joint.

The adhesive bonding region can have a thickness of preferably less than or equal to 0.05 mm, e.g. being embodied as a "zero gap adhesive joint", or a thickness greater than or equal to 0.05 mm. The thickness preferably corresponds to a mean thickness if the surface of the vehicle component and/or of the attachment is of textured or jagged design, e.g. to the nominal spacing defined in the attached figures (drawing scale does not take account of tolerances).

The vehicle component is preferably a shaft and the attachment can expediently be a gearwheel, a flange or a cam.

The flange is preferably formed axially on one shaft end. The cam is preferably formed along and/or radially on a shaft.

The shaft can be embodied as a camshaft or crankshaft, for example.

The vehicle component can also be an engine block, for example, and the attachment can expediently comprise an engine support.

The adhesive means is preferably oil-resistant and is exposed to oil in the operating state of the vehicle component and/or of the attachment, e.g. wetted with oil or even soaked in oil. The oil can be engine oil and/or transmission oil, for example.

Carbides can be used as particles, for example.

The adhesive bonding region is expediently an adhesive joint, e.g. an adhesive layer.

It should be mentioned that, in the event of possible failure of the adhesive bond between the vehicle component and the attachment due to cohesion failure, it is possible, by means of the particles, for a crack to be diverted around the particles because their strength is expediently greater than the strength of the adhesive means. The critical surface area of the adhesive bond, in comparison especially with the potential crack surface, can thereby be increased. Moreover, the higher adhesive effect of the adhesive means at the particles can have a positive effect and thus act to increase strength.

The present disclosure is not restricted to an arrangement comprising a vehicle component and an attachment but also includes a vehicle, preferably a motor vehicle, in particular a commercial vehicle, e.g. a bus or a heavy goods vehicle, having a vehicle component as disclosed herein.

The above-described preferred embodiments and features of the present disclosure can be combined with one another. Other advantageous developments of the present disclosure are disclosed in the dependent claims or will become apparent from the following description of preferred embodiments of the present disclosure in conjunction with the attached figures.

DETAILED DESCRIPTION

Figure 1:
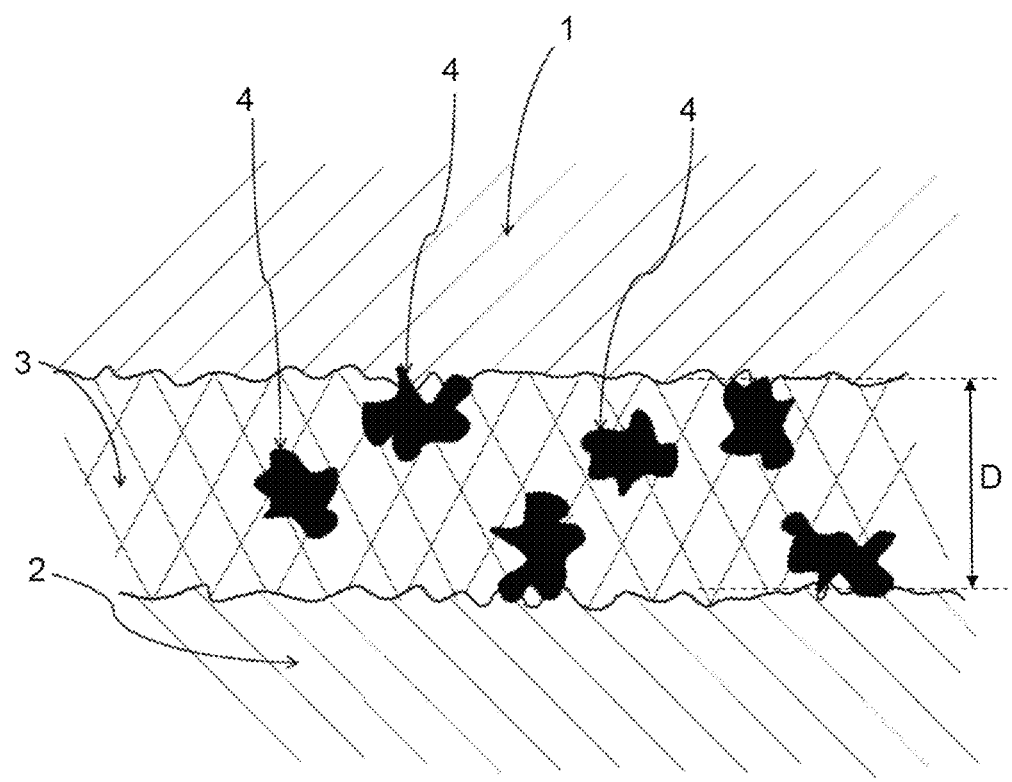
FIG. 1 shows a schematic illustration of a vehicle component having an attachment and an adhesive joint in accordance with one embodiment of the present disclosure.

FIG. 1 shows a schematic view of a section of a vehicle component 1 and of a section of an attachment 2 mounted thereon, in accordance with one embodiment of the present disclosure. The vehicle component 1 can be a shaft, for example, while the attachment 2 can then be a gearwheel, a flange or a cam, for example. However, it is likewise possible for the vehicle component 1 to be an engine block, for example, while the attachment 2 can then be an engine support.

The vehicle component 1 and the attachment 2 are connected to one another by means of an adhesive means (e.g. adhesive) 3 in an adhesive bonding region (e.g. adhesive joint), in particular an adhesive bonding region subject to shear stress. Into the adhesive means 3, particles 4 are introduced, the strength of which is greater than the strength of the adhesive means 3. Moreover, the particles 4 are harder than the material of the vehicle component 1 and the material of the attachment 2. The cohesive strength of the adhesive means 3 is expediently greater than the adhesive strength of the adhesive means 3.

In the embodiment shown in FIG. 1, the thickness D of the adhesive bonding region, that is to say, in particular, the thickness D of the adhesive joint, is more than 0.05 mm. In the embodiment shown in FIG. 1, the thickness D of the adhesive bonding region and the dimensions of the particles 4 are embodied in such a way that individual particles 4 are in contact only with the vehicle component 1, while they are spaced apart from the attachment 2, whereas other particles 4 are in contact only with the attachment 2, while they are spaced apart from the vehicle component 1.

It is apparent from FIG. 1 that the surface of the particles 4 is jagged, with the result that an enlargement of the surface area is achieved. The surfaces of the vehicle component 1 and of the attachment 2 are likewise jagged but can also expediently be of textured design (e.g. structured design), with the result that an enlargement of the surface area is achieved. By virtue of the fact that the surfaces of the particles 4, on the one hand, and the surfaces of the vehicle component 1 and of the attachment 2, on the other hand, are of jagged design, an interlocking effect that increases the friction coefficient can be brought about between the particles 4, on the one hand, and the vehicle component 1 and the attachment 2, on the other hand. The jagged particles 4 furthermore lead to a lengthening of a potential failure crack, e.g. a crack surface, by means of the adhesive bond, resulting, in particular, in an increase in the strength of the adhesive bond between the vehicle component 1 and the attachment 2.

The surface areas with an adhesive effect can be increased by introducing small solid particles 4, preferably uniformly, into the adhesive means 3. The particles 4 should be arranged so as to be distributed as uniformly as possible in the adhesive 3. The particles 4 expediently have a surface which is as jagged as possible and is therefore large. To take account of a potential failure of the adhesive bond between the vehicle component 1 and the attachment 2 due to cohesion failure, the introduced particles 4 enable a potential crack to be diverted around the particles 4 since the strength of the particles 4 is greater than the strength of the adhesive means 3. The critical surface area of the adhesive bond, in comparison with the potential crack surface, can thereby be increased. Moreover, the higher adhesive effect of the adhesive means 3 at the particles 4 has a positive effect, that is to say increases strength.

Figure 2:
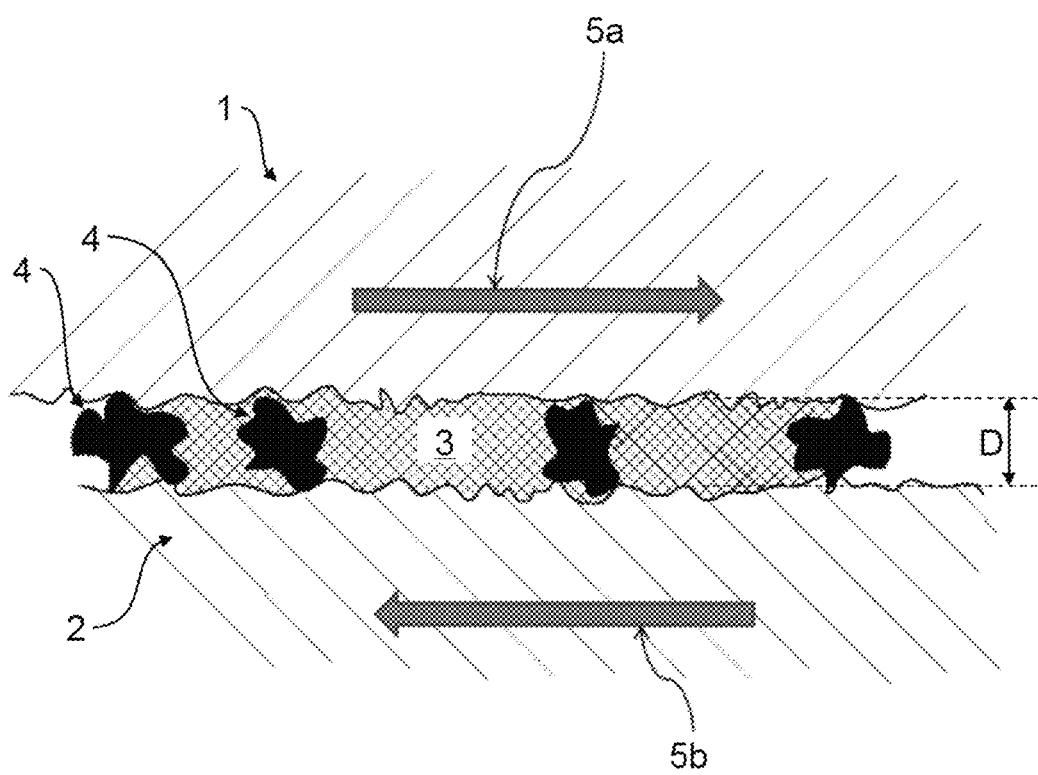
FIG. 2 shows a schematic illustration of a vehicle component having an attachment and an adhesive joint in accordance with another embodiment of the present disclosure.

FIG. 2 shows a schematic view of a section of a vehicle component 1 and of a section of an attachment 2 mounted thereon in accordance with another embodiment of the present disclosure. The embodiments shown in FIGS. 1 and 2 partially correspond, and therefore the same reference signs are used for similar or identical parts and, to explain them, reference is also made to the description of the other embodiment in order to avoid repetitions.

In the embodiment shown in FIG. 2, the thickness D of the adhesive bonding region, that is to say, in particular, the thickness D of the adhesive joint, is less than 0.05 mm. The adhesive bond can be embodied as a "zero-gap adhesive joint".

The thickness D of the adhesive bonding region and the dimensioning of the particles 4 are such that individual particles 4 are in contact, preferably interlocked, with the vehicle component 1, on the one hand, and simultaneously with the attachment 2, on the other hand. If hard particles 4, e.g. carbides, are used, the ability of the adhesive bonding region to bear shear stress, which is illustrated schematically by reference signs 5a (shear force 1) and 5b (shear force 2), is increased. In this case, the particles 4 in contact with the parts to be adhesively bonded, i.e. the vehicle component 1 and the attachment 2, can have the effect of increasing the friction coefficient.

One method of increasing the adhesive strength can be achieved by embedding hard particles 4 into the (parent) material of the vehicle component 1 and/or of the attachment 2. This can be accomplished by applying a static normal force or a dynamic movement of the component surfaces to be adhesively bonded along the adhesive bonding region, e.g. when joining the parts to be adhesively bonded, i.e. the vehicle component 1 and the attachment 2.

The present disclosure is not restricted to the preferred embodiments described above. On the contrary, a large number of variants and modifications is possible which likewise make use of the inventive concept and therefore fall within the scope of protection. Moreover, the present disclosure also claims protection for the subject matter and features of the dependent claims, independently of the features and claims to which they refer back.

LIST OF REFERENCE SIGNS 1 vehicle component, in particular shaft or engine block
2 attachment, in particular gearwheel, cam or engine support
3 adhesive means, in particular adhesive
4 particles
5a shear force 1
5b shear force 2
D thickness of the adhesive bonding region, in particular of the adhesive joint

We claim:
1. A vehicle component comprising:
at least one attachment;
an adhesive means connecting the at least one attachment and the vehicle component; and
particles introduced into the adhesive means,
wherein the particles increase friction between the vehicle component and the at least one attachment or by means of the particles introduced into the adhesive means an increase in shear strength is achieved, and
wherein, in an event of a possible failure of the adhesive bond between the vehicle component and the at least one attachment due to cohesion failure, by means of the particles a crack is diverted around the particles because the strength of the particles is greater than the strength of the adhesive means.

2. The vehicle component according to claim 1, wherein the particles are harder in an adhesive bonding region than the material of the vehicle component.

3. The vehicle component according to claim 1, wherein the particles are harder in an adhesive bonding region than the material of the at least one attachment.

4. The vehicle component according to claim 1, wherein a surface of the particles is jagged.

5. The vehicle component according to claim 1, wherein a surface of the vehicle component or a surface of the at least one attachment is textured.

6. The vehicle component according to claim 1, wherein the particles are in contact with, interlocked with, or worked into a surface of the vehicle component or of the at least one attachment.

7. The vehicle component according to claim 1, wherein the thickness of an adhesive bonding region and the dimensioning of the particles are such that individual particles are in contact or interlocked with the vehicle component and the at least one attachment.

8. The vehicle component according to claim 1, wherein the thickness of an adhesive bonding region and the dimensioning of the particles are such that individual particles are in contact or interlocked only with the vehicle component, whereas other particles are in contact or interlocked only with the at least one attachment.

9. The vehicle component according to claim 1, wherein the diameter, the width or length of the particles is greater than 0.01 mm and/or less than 0.1 mm.

10. The vehicle component according to claim 1, wherein the adhesive means is part of a frictional joint.

11. The vehicle component according to claim 1, wherein an adhesive bonding region has a thickness of less than or equal to 0.05 mm or greater than or equal to 0.05 mm.

12. The vehicle component according to claim 1, wherein the vehicle component is a shaft and the at least one attachment is a gearwheel, a cam or a flange.

13. The vehicle component according to claim 1, wherein the vehicle component is an engine block and the at least one attachment comprises an engine support.

14. The vehicle component according to claim 1, wherein the adhesive means is oil-resistant and is exposed to oil in an operating state of the vehicle component or the at least one attachment.

15. The vehicle component according to claim 1, wherein the vehicle component is an engine part.

16. A motor vehicle, comprising:
a vehicle component;
at least one attachment;
an adhesive means connecting the at least one attachment and the vehicle component; and
particles introduced into the adhesive means,
wherein the particles increase friction between the vehicle component and the at least one attachment or by means of the particles introduced into the adhesive means an increase in shear strength is achieved, and
wherein, in an event of a possible failure of the adhesive bond between the vehicle component and the at least one attachment due to cohesion failure, by means of the particles a crack is diverted around the particles because the strength of the particles is greater than the strength of the adhesive means.

* * * * *